United States Patent
Okamoto et al.

(10) Patent No.: US 8,649,680 B2
(45) Date of Patent: Feb. 11, 2014

(54) OPTICAL COMMUNICATION SYSTEM

(75) Inventors: Atsushi Okamoto, Hokkaido (JP); Kazuyuki Morita, Hokkaido (JP)

(73) Assignee: National University Corporation Hokkaido University, Hokkaido (JP)

( * ) Notice: Subject to any disclaimer, the term of this patent is extended or adjusted under 35 U.S.C. 154(b) by 133 days.

(21) Appl. No.: 13/502,887

(22) PCT Filed: Oct. 15, 2010

(86) PCT No.: PCT/JP2010/068158
§ 371 (c)(1),
(2), (4) Date: Apr. 19, 2012

(87) PCT Pub. No.: WO2011/052405
PCT Pub. Date: May 5, 2011

(65) Prior Publication Data
US 2012/0230687 A1 Sep. 13, 2012

(30) Foreign Application Priority Data
Oct. 30, 2009 (JP) ................... 2009-249726

(51) Int. Cl.
*H04J 14/02* (2006.01)
*H04J 14/04* (2006.01)
*H04B 10/2581* (2013.01)

(52) U.S. Cl.
CPC ................. *H04B 10/2581* (2013.01)
USPC .............. 398/44; 398/87; 398/88; 398/143

(58) Field of Classification Search
CPC ............ H04B 10/2581; H04J 14/04
USPC ............ 398/44, 45, 55, 82, 84–87, 142–144; 359/3, 10, 15; 385/27, 28
See application file for complete search history.

(56) References Cited

U.S. PATENT DOCUMENTS

| | | | | |
|---|---|---|---|---|
| 5,136,666 | A * | 8/1992 | Anderson et al. | 385/24 |
| 2007/0242955 | A1 * | 10/2007 | Kavehrad | 398/130 |
| 2009/0046337 | A1 * | 2/2009 | Waldman | 359/24 |

FOREIGN PATENT DOCUMENTS

| | | |
|---|---|---|
| JP | 04-121714 | 4/1992 |
| JP | 04-221927 | 8/1992 |

OTHER PUBLICATIONS

International Search Report for corresponding International Application No. PCT/JP2010/068158 mailed Nov. 22, 2010.
Form PCT/ISA/237 for corresponding International Application No. PCT/JP2010/068158 dated Nov. 22, 2010.

(Continued)

*Primary Examiner* — Dalzid Singh
(74) *Attorney, Agent, or Firm* — Renner, Otto, Boisselle & Sklar, LLP

(57) ABSTRACT

The present invention causes spatial-mode light emitted from an optical fiber (11), which is a multimode fiber, to pass through a photorefractive medium (13). The photorefractive medium (13) includes holograms for signal separation that are written by irradiation of the photorefractive medium with (i) guide light having a wave front identical to the wave front of signal light having a particular spatial mode and (ii) control light. The photorefractive medium includes holograms recorded in a multiplex manner with use of control light having different incidence angles in correspondence with respective spatial modes. For signal separation, irradiating the photorefractive medium (13) with control light (15) having a particular angle separates signal light having a spatial mode corresponding to the incidence angle of the control light (15).

13 Claims, 14 Drawing Sheets

(56) References Cited

OTHER PUBLICATIONS

KDDI R&D Labs, Inc., "Development of MIMO Processing Technique for Optical OFDM Transmission", Nov. 6, 2007, http://kiddilabsjp/press/img/75_1.pdf and partial English translation.
H. R. Stuart, "Dispersive Multiplexing in Multimode Optical Fiber", Science, vol. 289, Jul. 14, 2000, pp. 281-283.
Junichi Sakai, "Iso Kyoyaku Kogaku (Phase Conjugate Optics)", pp. 6-7, 97 and partial English translation.
Pochi Yea, "Introduction to Photorefractive Nonlinear Optics", A Wiley-Interscience Publication, 1948, pp. 1-41, 82-117.
Tsutomu Shimura, "Systems, Devices and Materials for the Holographic Data Storage", pp. 18-19 and partial English translation.
Dubois et al., "Selective mode excitation in graded-index multimode fiber by a computer-generated optical mask", Optics Letters, vol. 19, No. 7, Apr. 1, 1994, pp. 433-435.
Lars Thylen, "The beam propagation method: an analysis of its applicability", Optical and Quantum Electronics, vol. 15, 1983, pp. 433-439.
Bahaa et al., "Fundamentals of Photonics", Wiley-Interscience, 1991, Chapter 9.
Morita et al., "Volume Holographic Demultiplexer for Spatial Mode Division Multiplexing in Optical Fiber Communication", OSA/ACP 2009, Presented in the academic meeting on Nov. 4, 2009, Proceedings of academic meeting issued on Nov. 2, 2009, WL16.
Okamoto et al., "All-optical Demultiplexer for mode division multiplex communication technique with a multimode optical fiber", Technical Digest of 7$^{th}$ International Conference on Optics-photonics Design & Fabrication (ODF' 10), Presented in the academic meeting on Apr. 20, 2010, Proceedings of academic meeting issued on Apr. 19, 2010, 20PSa-57.
Okamoto et al., "Mode division multiplex communication technique based on dynamic volume hologram and phase conjugation", Proceedings of SPIE (Photonics Europe 2010), vol. 7716-78, Presented in the academic meeting on Apr. 15, 2010, Proceedings of academic meeting issued on Apr. 12, 2010, pp. 771627(1-10).
Morita et al., "Compatibility to WDM of Volume Holographic Demultiplexer for Spatial Mode Division Multiplexing", Technical Digest of the 15$^{th}$ Optoelectronics and Communications Conference (OECC 2010), Presented in the academic meeting on Jul. 7, 2010, Proceedings of academic meeting issued on Jul. 5, 2010, 7E4-3.
Okamoto et al., "Experiment on Dynamic Reconfigurable Diffraction Element for Mode Division Multiplex Communication", Technical Digest of the 15$^{th}$ Optoelectronics and Communications Conference (OECC 2010), Presented in the academic meeting on Jul. 7, 2010, Proceedings of academic meeting issued on Jul. 5, 2010, 7P-23.
Soma et al., "Experiment on Separating of LP Modes by Dynamic Multiplex Holographic Element for Mode Division Multiplex Communication", Technical Digest of MOC 2010 (CD-ROM), Presented in the academic meeting on Nov. 3, 2010, Proceedings of academic meeting issued on Oct. 31, 2010, WB2.
Oda et al., "All-optical demultiplexer based on dynamic multiple holograms for optical MIMO processing and mode division multiplexing", Proceedings of SPIE (Photonics West 2011), vol. 7958, Presented in the academic meeting on Jan. 27, 2011, Proceedings of academic meeting issued on Jan. 22, 2011, pp. 79580J(1-9).
Okamoto et al., "Multi-Excitation Spatial Modes using Single Spatial Light Modulator for Mode Division Multiplexing", OFC/NFOEC 2012 technical digest, Presented in the academic meeting on Mar. 7, 2012, Proceedings of the academic meeting issued on Mar. 4, 2012, JW2A.38.

* cited by examiner

DIFFRACTION LIGHT INTENSITIES FOR RESPECTIVE ANGLE COMPONENTS
(WITH NO RANDOM-PHASE PLATE AND NO LENS)

DIFFRACTION LIGHT INTENSITIES FOR RESPECTIVE ANGLE COMPONENTS
(WITH RANDOM-PHASE PLATE AND LENS)

BE: BEAM EXPANDER       M: MIRROR    PBS: POLARIZED BEAM SPLITTER
P: POLARIZER    A: ANALYZER    SLM: SPATIAL LIGHT MODULATOR
L: LENS        HWP: HALF-WAVELENGTH PLATE  CCD: CHARGE COUPLED DEVICE
RPM: RANDOM-PHASE PLATE

OPTICAL COMMUNICATION SYSTEM

TECHNICAL FIELD

The present invention relates to an optical communication system involving use of an optical fiber (for example, a multimode fiber) that serves as an optical waveguide for transmission and that is capable of transmitting signal light in a plurality of spatial modes.

BACKGROUND ART

A system of a current optical communication, especially a high-speed, large-capacity optical communication, uses a single-mode fiber as an optical waveguide for transmission. This is mainly in view of the following problem: A multimode fiber allows light in a plurality of modes to propagate through a single optical fiber, the individual modes involving respective propagation delay periods different from one another. Thus, the so-called mode dispersion effect problematically causes an input pulse, which is a signal, to spread at an output terminal (see (b) of FIG. 11). The use of a single-mode fiber limits light propagating through the fiber to be in only one spatial mode, thereby eliminating the possibility of mode dispersion at its principle level (see (a) of FIG. 11). A single-mode fiber thus allows light with an extremely short pulse to be transmitted to a distant location with no waveform degradation, and consequently enables a high-speed, large-capacity communication.

The present-day IT society is supported by an optical-fiber communication network that uses a single-mode transmission to achieve a Tb/s channel capacity for each fiber. This is made possible by a WDM (wavelength division multiplexing) transmission technique, which transmits a plurality of signals with respective wavelengths through a single fiber. Such a system is, however, said to have a technical limit of (signal with approximately 100 Gb/s per wavelength)×(number of wavelength multiplexing=100)=approximately 10 Tb/s. This suggests, in consideration of an increase in communication demand, the possibility of main communication networks being saturated in the near future.

Under such circumstances, the research below has recently been conducted to overcome the limit in channel capacity in WDM.

Non Patent Literature 1 discloses a scheme for increasing a transmission capacity per wavelength by the MIMO (multiple input, multiple output) processing technique, which has been in practical use mainly in the wireless telecommunications field. The scheme has successfully doubled a channel capacity by polarized wave multiplexing (that is, modulating and demodulating signals independent of one another for respective polarized waves).

Further, Non Patent Literature 2 proposes a mode-division multiplex communication involving use of a multimode fiber.

CITATION LIST

Non Patent Literature 1

*Hikari OFDM Denso-yo MIMO Shori Gijutsu no Kaihatsu* (Development of MIMO Processing Technique for Optical OFDM Transmission) (http://www.kddilabs.jp/press/img/75_1.pdf)

Non Patent Literature 2

H. R. Stuart, *Dispersive Multiplexing in Multimode Optical Fiber*, SCIENCE, 289, pp. 281-283 (2000)

SUMMARY OF INVENTION

Technical Problem

The scheme of Non Patent Literature 1, however, merely has a degree of freedom of two, that is, lengthwise and widthwise, in the polarized-wave mode. The polarized-wave multiplexing system is limited in multiplicity=2 at its principle level.

The technique of Non Patent Literature 2 spatially disposes a plurality of detectors on the exit side of a fiber, and carries out an electrical processing with respect to a photodetection signal from each of the detectors for demodulation of a mode-division multiplex signal. This system is, however, low in accuracy due to its inability to use spatial phase information of light, and has yet to achieve a practical processing speed because the demodulation of a mode-division multiplex signal requires a complicated electrical processing.

In view of the above, in order to extend the modes of mode-division transmission to not only the polarized-wave mode but also all spatial modes of light being transmitted through a fiber, that is, in order to transmit different pieces of data (information) in respective spatial modes different from one another, a technique is necessary that causes optical signals which, at the exit end of a fiber, include a mix of information for all spatial modes to be separated into optical signals in respective spatial modes independent of one another before being converted into electric signals. Further, the separation of optical signals requires a technique for solving the problem that spatial-mode light transmitted through an optical fiber is changed over time or distorted by an external environment (for example, a bend of the fiber and/or a temperature change).

The present invention has an object to establish and provide an all-optical demultiplexing technique that separates multiplexed spatial-mode light, while it remains to be light, into light beams in respective particular spatial modes.

Solution to Problem

In order to solve the above problem, an optical communication system of the present invention is an optical communication system for carrying out a communication, the optical communication system including: an optical fiber for transmitting signal light having a plurality of spatial modes; a multiplex-hologram recording section including holograms recorded therein in a multiplex manner in correspondence with the respective spatial modes of the signal light; a lens for condensing the signal light emitted from an end of the optical fiber and causing the condensed signal light to enter the multiplex-hologram recording section; and a control-light emitting section for emitting control light to the multiplex-hologram recording section at angles different from one another in correspondence with the respective spatial modes, the multiplex-hologram recording section including multiplex holograms recorded therein by irradiation of the multiplex-hologram recording section with (i) guide light which has a wave front identical to a wave front of the signal light and (ii) the control light, the signal light having the spatial modes, the signal light having been multiplexed and inputted to the multiplex-hologram recording section when the multiplex-hologram recording section separates the signal light, being separated along paths of the control-light emitting section in respective directions of emission of the control light.

Further, an optical communication system of the present invention is an optical communication system for carrying out a communication, the optical communication system including: an optical fiber for transmitting signal light having a plurality of spatial modes; a multiplex-hologram recording section including holograms recorded therein in a multiplex manner in correspondence with the respective spatial modes of the signal light; a lens for condensing the signal light emitted from an end of the optical fiber and causing the condensed signal light to enter the multiplex-hologram recording section; and a control-light emitting section for emitting control light to the multiplex-hologram recording section at angles different from one another in correspondence with the respective spatial modes, with use of the multiplex-hologram recording section, which includes holograms written therein by irradiation of the multiplex-hologram recording section with (i) guide light which has a wave front identical to a wave front of a signal light beam having a particular spatial mode and (ii) the control light, the optical communication system causing holograms to be recorded in a multiplex manner by the control-light emitting section for emitting the control light to the multiplex-hologram recording section at the angles different from one another in correspondence with the respective spatial modes, after the recording, the optical communication system, when the multiplex-hologram recording section separates the signal light for a signal communication, emitting (i) the guide light which has the wave front identical to the wave front of the signal light beam having the particular spatial mode and (ii) the control light to the multiplex-hologram recording section so that the signal light having the spatial modes, the signal light having been multiplexed and inputted to the multiplex hologram recording section, is separated along paths of the control-light emitting section in respective directions of emission of the control light.

Further, an optical communication system of the present invention is an optical communication system for carrying out a communication, the optical communication system including: an optical fiber for transmitting signal light having a plurality of spatial modes; a multiplex-hologram recording section including holograms recorded therein in a multiplex manner in correspondence with the respective spatial modes of the signal light; a lens for condensing the signal light emitted from an end of the optical fiber and causing the condensed signal light to enter the multiplex-hologram recording section; a control-light emitting section for emitting control light to the multiplex-hologram recording section at angles different from one another in correspondence with the respective spatial modes; and a phase conjugator for (i) amplifying light having passed through the multiplex-hologram recording section and (ii) returning the amplified light to the multiplex-hologram recording section, with use of the multiplex-hologram recording section, which includes holograms written therein by irradiation of the multiplex-hologram recording section with (i) light from the phase conjugator which light has a wave front identical to a wave front of a signal light beam having a particular spatial mode and (ii) the control light, the optical communication system causing holograms to be recorded in a multiplex manner by the control-light emitting section for emitting the control light to the multiplex-hologram recording section at the angles different from one another in correspondence with the respective spatial modes, after the recording, the optical communication system, when the multiplex-hologram recording section separates the signal light for a signal communication, emitting (i) the light from the phase conjugator which light has the wave front identical to the wave front of the signal light beam having the particular spatial mode and (ii) the control light to the multiplex-hologram recording section so that the signal light having the spatial modes, the signal light having been multiplexed and inputted to the multiplex hologram recording section, is separated along paths of the control-light emitting section in respective directions opposite to directions of emission of the control light.

According to the above arrangement, the multiplex-hologram recording section includes multiplex holograms recorded therein by irradiation of the multiplex-hologram recording section with (i) guide light which has a wave front identical to a wave front of the signal light and (ii) control light emitted at angles different from one another in correspondence with the respective spatial modes. Further, the signal light having the spatial modes, the signal light having been multiplexed and inputted to the multiplex-hologram recording section, is separated in respective directions of the angles of the control light emitted in the multiplex-hologram recording. In other words, the above arrangement makes it possible to cause optical signals, which include a mix of optical signals in a plurality of spatial modes when emitted from the optical fiber, to be separated into light in different modes while remaining as light.

Advantageous Effects of Invention

The present invention aims to establish a mode-division multiplex communication technique that allows transmission of data while combining a large number of spatial modes in a fiber and that, in consequence, dramatically further improves the channel capacity per fiber.

A conventional optical communication involving use of a multimode fiber does not discriminate modes for propagation through a fiber, and thus modulates identical data for all modes and uses a single photodetector at an output terminal to detect all mode light. This arrangement has thus failed to prevent mode dispersion mentioned above, and been unsuitable for a high-speed communication. The present invention, in contrast, modulates data independent for each mode for propagation through a multimode fiber, and thus separates data for each mode at an output terminal and uses independent photodetectors to detect signals. This method modulates and demodulates a piece of data in a single mode in a multimode fiber, and thus prevents the above-mentioned problem of mode dispersion. The present invention provides a theoretical channel capacity of (limit of transmission rate of a single mode fiber)×(number of modes in a multimode fiber), and will increase the channel capacity by a factor of approximately 10 to 100.

The present invention proposes an all-optical demultiplexing technique that makes it possible to cause optical signals, which include a mix of optical signals in a plurality of spatial modes when emitted from the optical fiber, to be separated into light in different modes while remaining as light. Even in the case where independent signals are modulated in respective spatial modes for transmission through an optical fiber, the present invention can easily convert the optical signals, as separated in the respective modes, into electric signals with use of a conventional photodetector. The present technique can thus be construed as a technique that allows a single fiber to be used as if it includes 10 to 100 fibers. The present invention allows optical signals, which have respective wavelengths multiplexed, to be transmitted in each spatial mode,

(a) is a diagram illustrating a recording operation by the optical communication system, and (b) and (c) are each a diagram illustrating a signal separation operation by the optical communication system.

Figure 3:
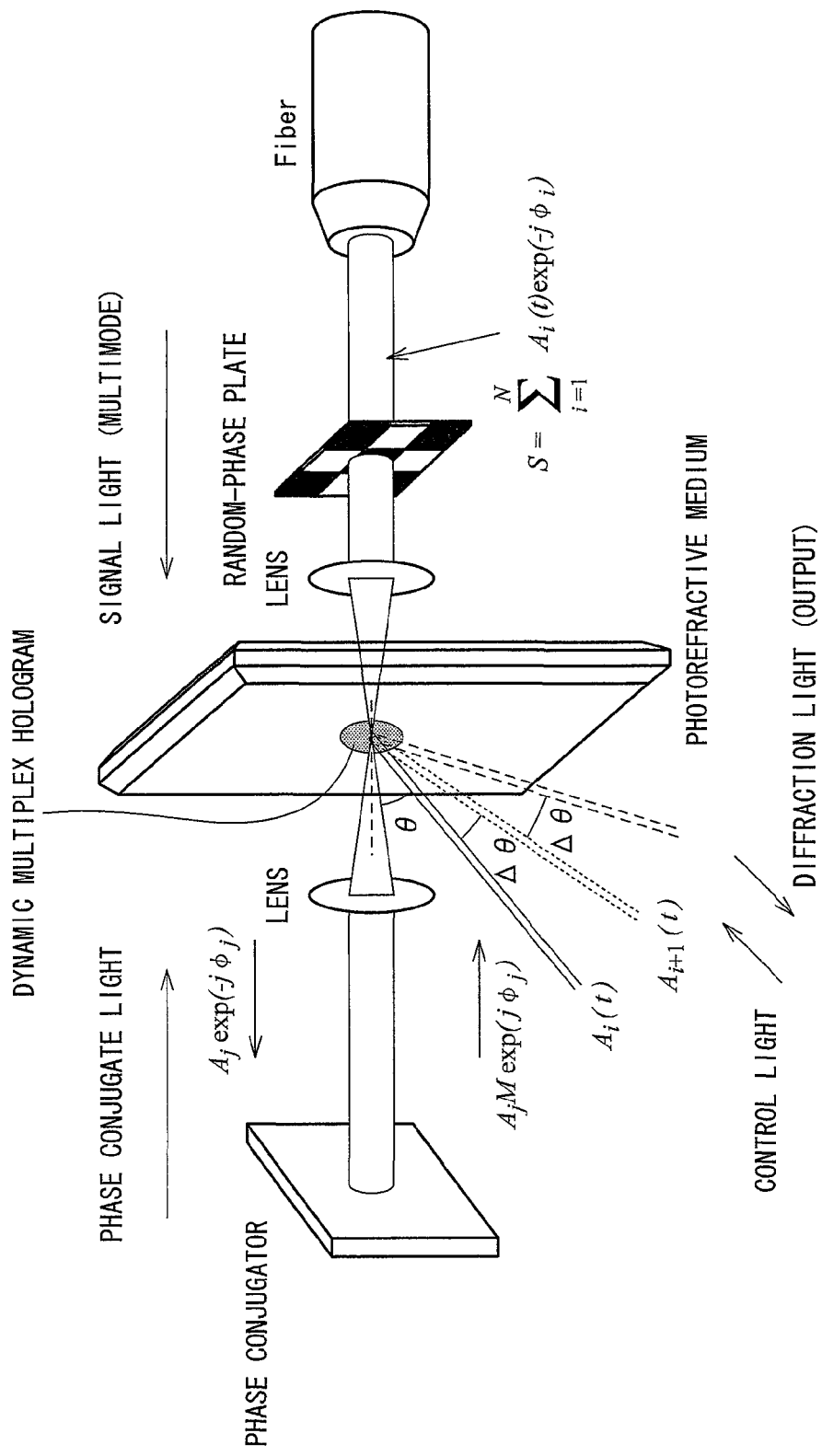

FIG. 3 is a diagram illustrating a system used in a simulation for an optical communication system of the present invention.

FIG. 4

(a) is a diagram illustrating spatially coincident spatial modes A, B, and C used in the simulation, and (b) is a diagram illustrating respective phase distributions for the spatial modes A, B, and C which phase distributions have been derived from the simulation.

Figure 5:
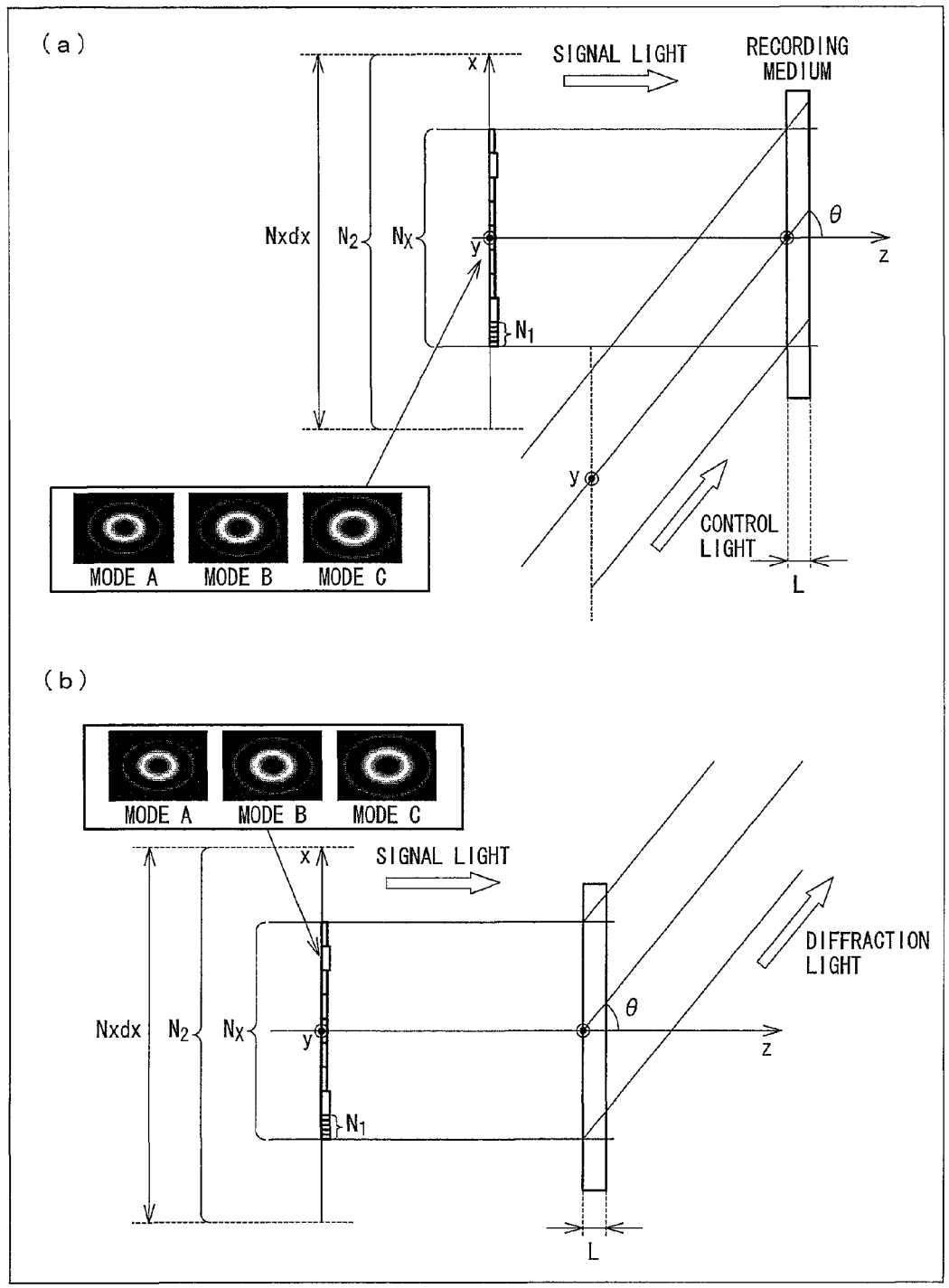

FIG. 5 illustrates analysis models for the simulation, where (a) is an analysis model for a hologram recording process, and (b) is an analysis model for a spatial-mode separation process.

Figure 6:
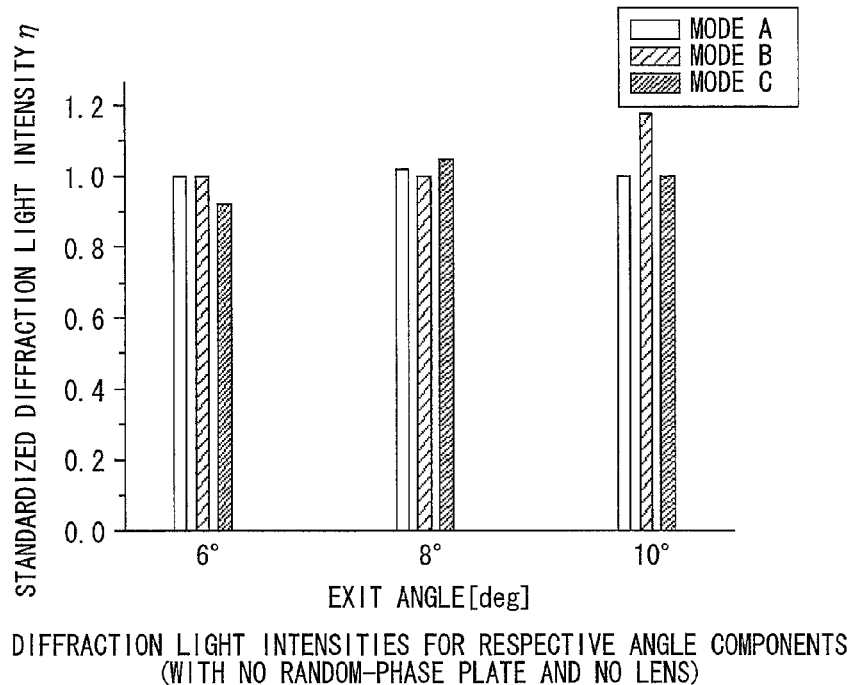

FIG. 6 is a graph indicative of the results of a simulation involving no random-phase plate and no lens in the system illustrated in FIG. 3.

Figure 7:
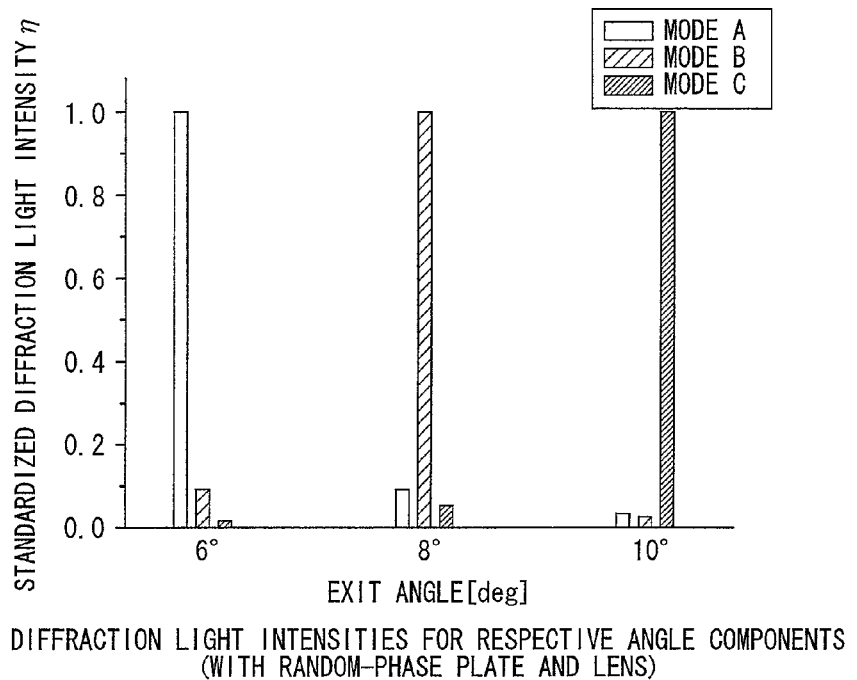

FIG. 7 is a graph indicative of the results of a simulation involving a random-phase plate and a lens in the system illustrated in FIG. 3.

Figure 8:
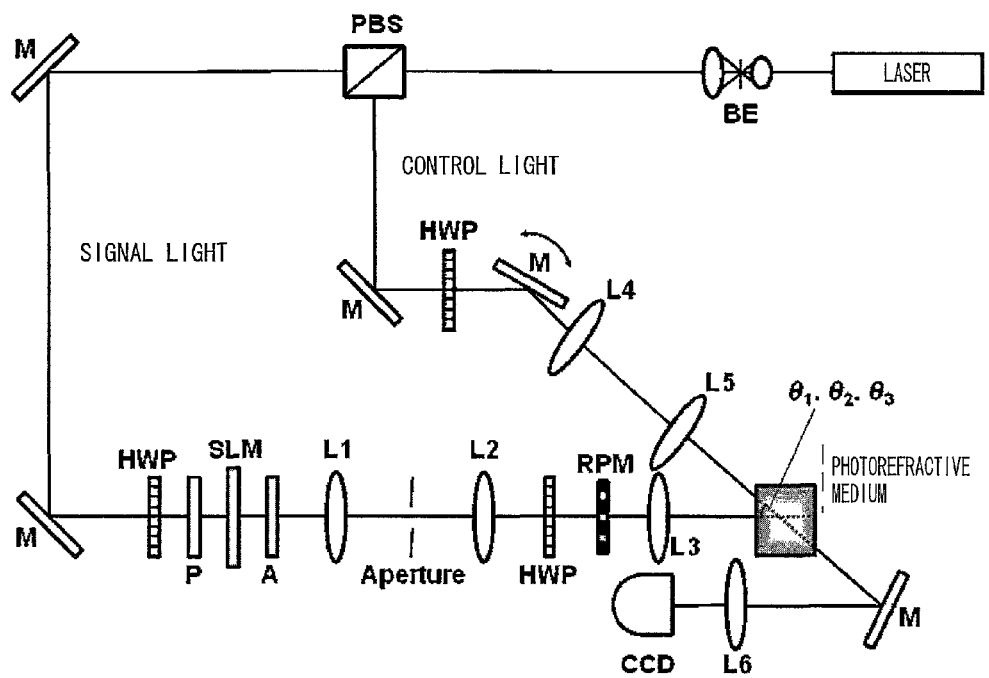

FIG. 8 is a diagram illustrating a system used to conduct an operation experiment for an optical communication system of the present invention.

Figure 9:
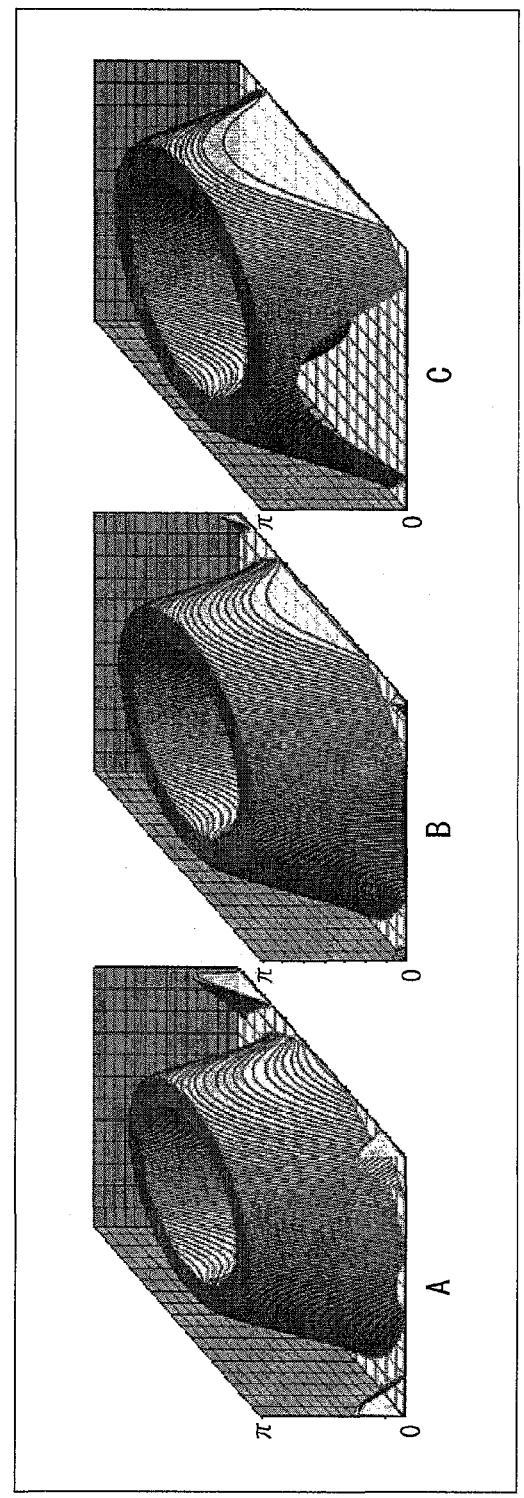

FIG. 9 is a diagram illustrating respective phase distributions for three spatial modes A, B, and C used in the operation experiment.

Figure 10:
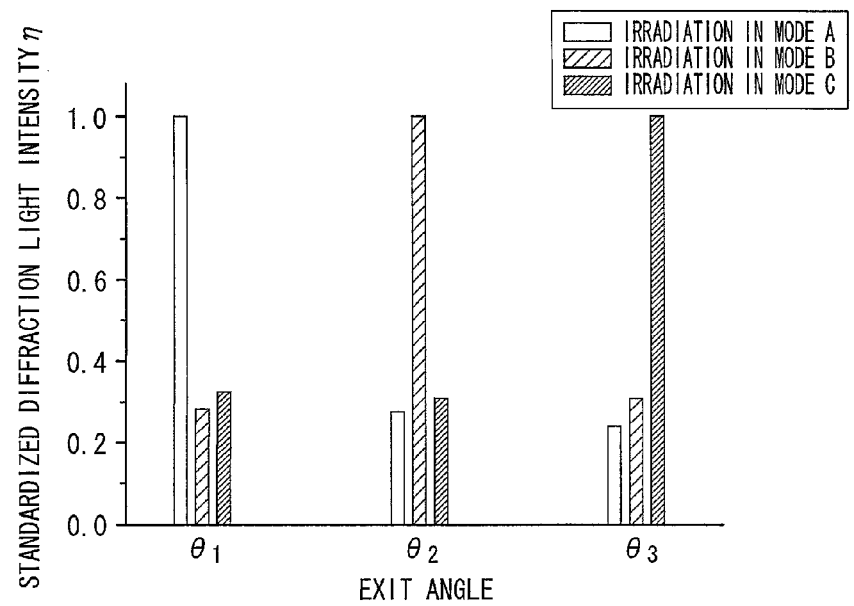

FIG. 10 is a graph indicative of the intensities, observed in the operation experiment, of diffraction light for respective components with respect to different angles.

Figure 11:
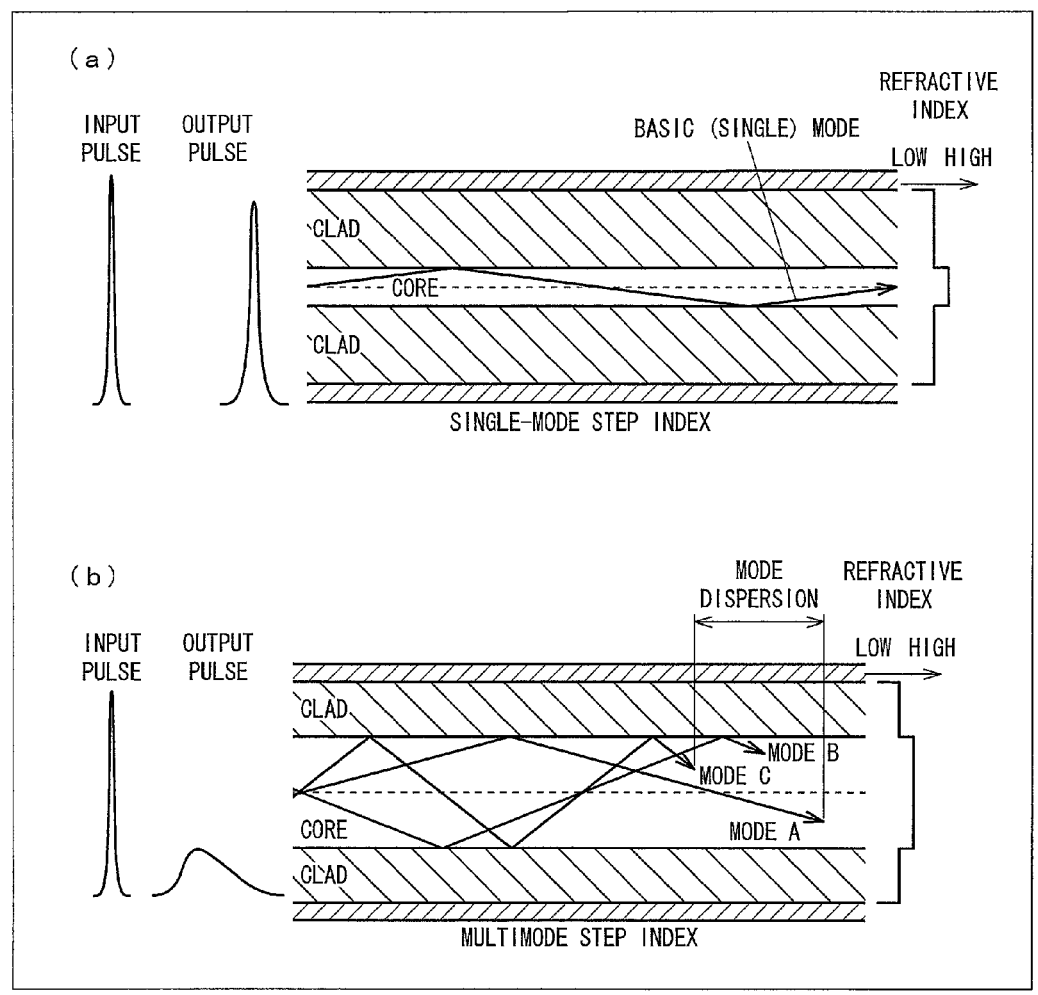

FIG. 11 illustrates a conventional optical communication system, where (a) is a diagram illustrating a case of using a single-mode fiber as an optical waveguide for transmission, and (b) is diagram illustrating a case of using a multimode fiber as an optical waveguide for transmission.

Figure 12:
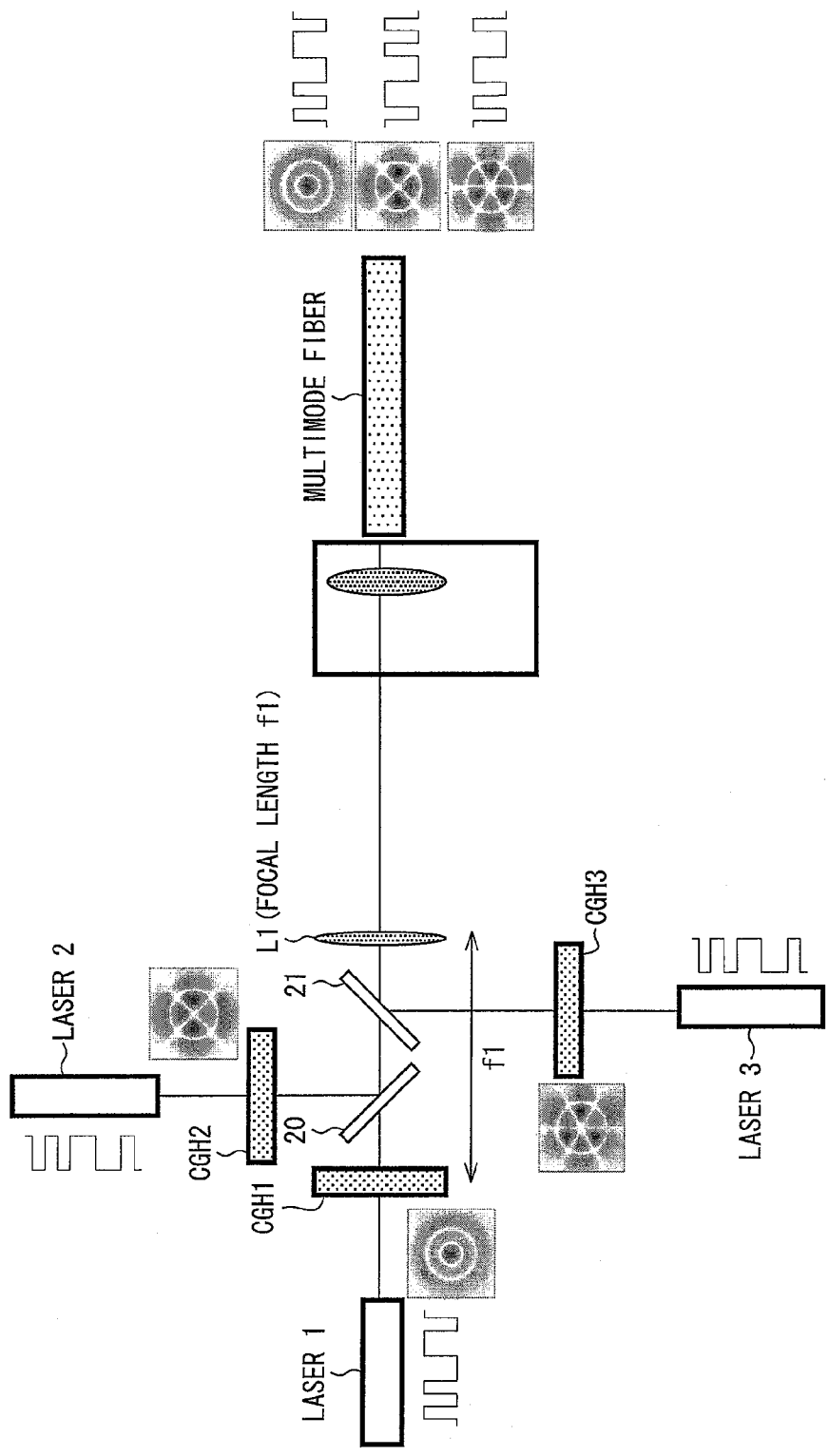

FIG. 12 is a diagram illustrating an example method for inputting multimode signal light in an optical communication system of the present invention.

Figure 13:
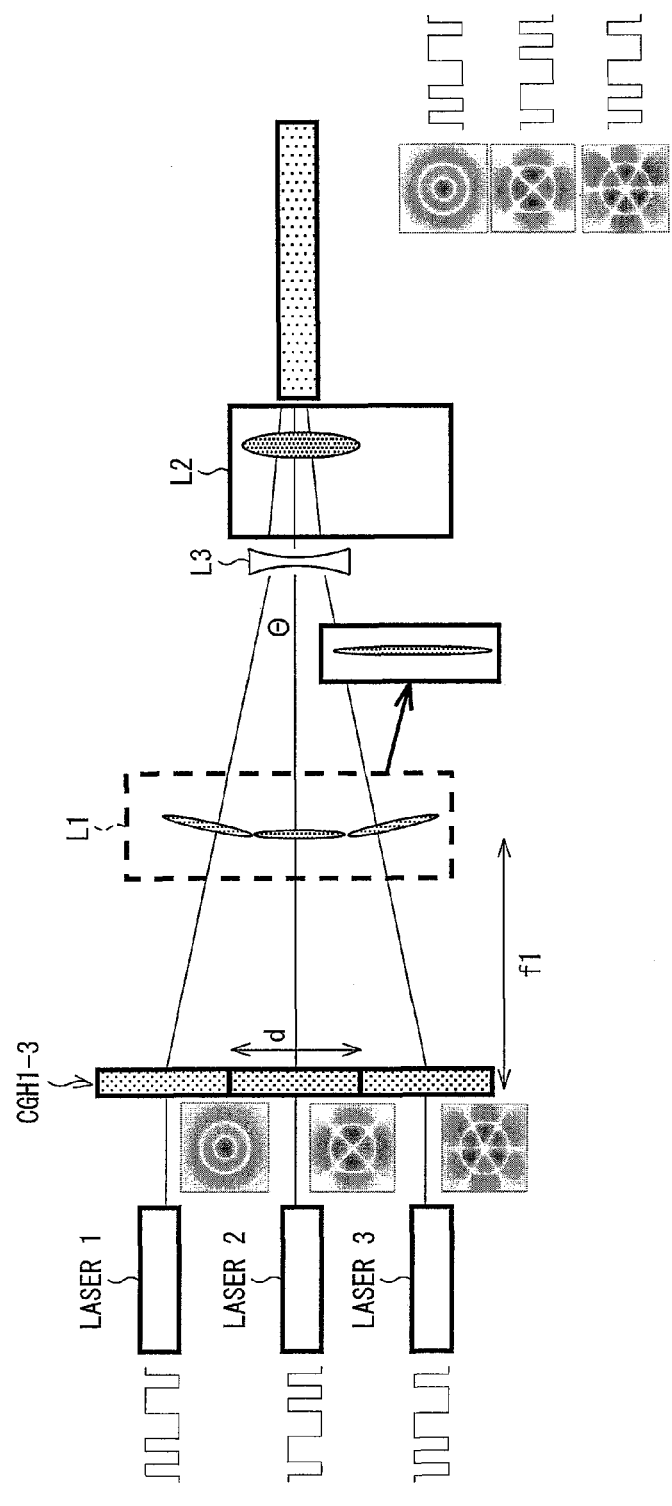

FIG. 13 is a diagram illustrating another example method for inputting multimode signal light in an optical communication system of the present invention.

Figure 14:
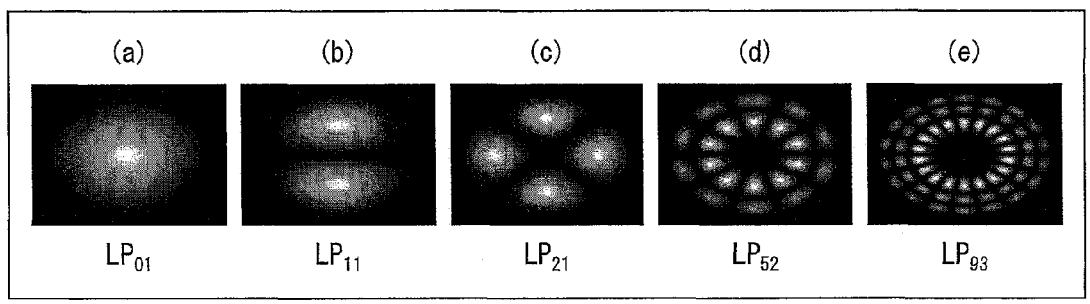

FIG. 14 is a diagram illustrating LP-mode light, that is, spatial-mode light to be recorded, in Example 2.

Figure 15:
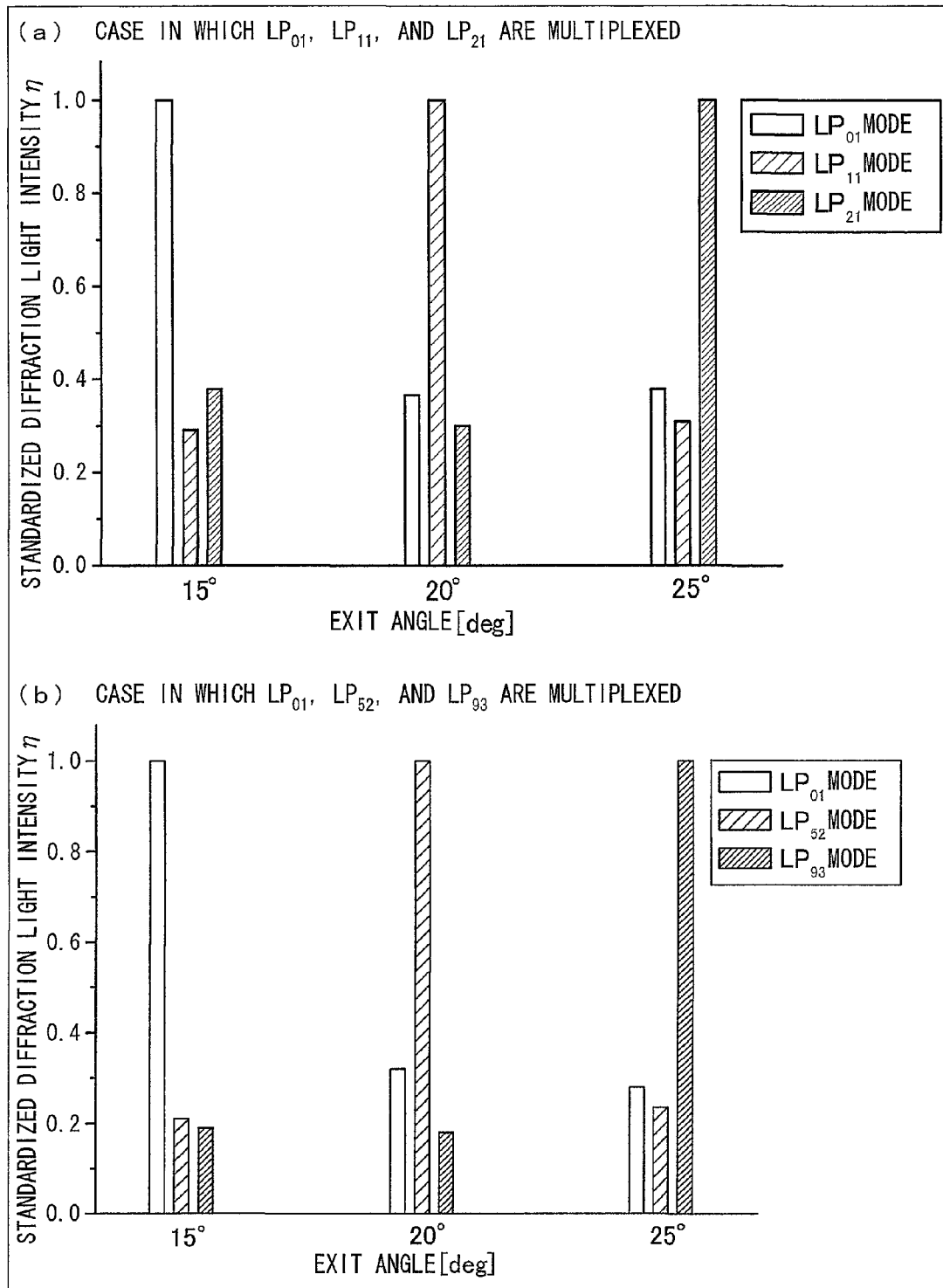

FIG. 15 is a graph illustrating the relation between (i) diffraction light for signal components obtained by mode separation involving LP-mode light and (ii) cross talk.

DESCRIPTION OF EMBODIMENTS

An embodiment of the present invention is described below in detail with reference to the drawings. The description below first refers to FIG. 1, which schematically illustrates a configuration of an optical communication system of the present embodiment.

Figure 1:
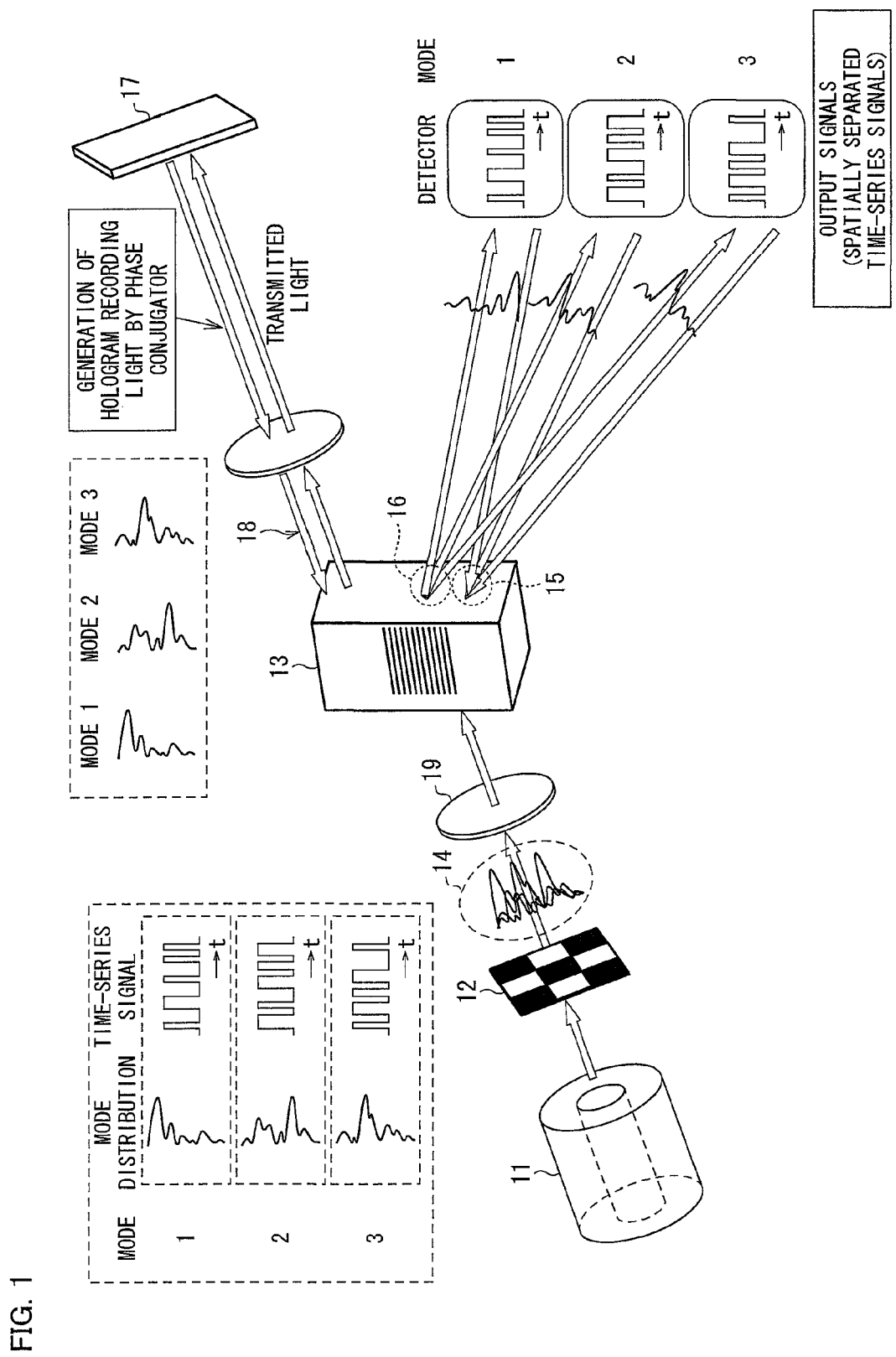
FIG. 1 is a diagram schematically illustrating a configuration of an optical communication system in accordance with an embodiment of the present invention.

The optical communication system illustrated in FIG. 1 causes spatial-mode light emitted from an optical fiber 11 (multimode fiber) to pass through a random-phase plate 12 and a lens 19 to generate guide light 14 (which has a wave front identical to that of signal light for use in communication). The lens 19 is distanced from the optical fiber 11 at a position adjusted such that the guide light 14 is subjected to a Fourier transform at the position of a photorefractive medium 13.

The optical fiber 11 of the present invention is not limited to a conventional multimode fiber as long as it is an optical waveguide that is capable of transmitting an optical signal in a plurality of modes. The present invention may thus use, as such an optical waveguide that is capable of transmitting an optical signal in a plurality of modes, a fiber that has recently been under development, such as a photonic crystal fiber and a multicore fiber. The guide light is not necessarily generated as emitted from the fiber 11, and may thus be generated by, with use of a spatial light modulator or the like, causing light to have a distribution equivalent to that of light having a spatial mode as emitted from the fiber 11.

Spatial mode light corresponding to a mode number j travels through the optical fiber 11, and is then transmitted through the random-phase plate 12 and the lens 19 to produce guide light 14 (or one of the components constituting it), which is represented by $$A_j \exp(-j\phi_j) \qquad (1),$$

where $A_j$ is the intensity of a light beam and $\exp(-j\phi_j)$ is the phase distribution in a spatial mode.

The random-phase plate 12 has a random phase distribution along a cross-sectional direction of the guide light 14, the phase distribution being varied in a manner that is spatially finer than that for the phase distribution of the guide light 14. In the case where the guide light (as well as signal light) before entering the random-phase plate 12 merely exhibits a spatially gentle phase change with respect to a difference in spatial mode, causing the guide light (or signal light) 14 to pass through the random-phase plate 12 allows the guide light to have a phase distribution that varies in a spatially very fine manner. The above arrangement, even with only a slight difference in spatial mode, generates guide light (which has a wave front identical to that of signal light) 14 having a greatly different phase distribution, and thus makes it possible to significantly increase accuracy in signal separation.

The random-phase plate 12 of the present invention, which markedly contributes to improvement in performance of the optical communication system, is not an essential constituent. The optical communication system can thus, depending on the kind of an optical fiber to be used, operate even without the random-phase plate 12. In other words, the optical communication system can omit the random-phase plate 12 in the case where the guide light (or signal light) 14 exhibits a phase change that is spatially sufficiently fine even without the passage through the random-phase plate 12.

The random-phase plate 12 and the lens 19 cause the intensity distribution in the spatial mode to be dispersed throughout a cross section of the beam, and thus substantially uniformizes the intensity distribution. The resulting guide light 14 passes through the photorefractive medium 13, and then enters a phase conjugator 17. This produces an optically amplified phase conjugate wave 18 represented by $$A_j M \exp(j\phi_j) \qquad (2),$$

where M is the amplification factor for the phase conjugator 17. The phase distribution is different in sign due to a property of the phase conjugator 17, that is, a property for inverting the phase (Sakai, Junichi: *Isou Kyouyaku Kougaku* [Phase Conjugate Optics], Asakura Publishing Co., Ltd., pp 6-7).

Figure 2:
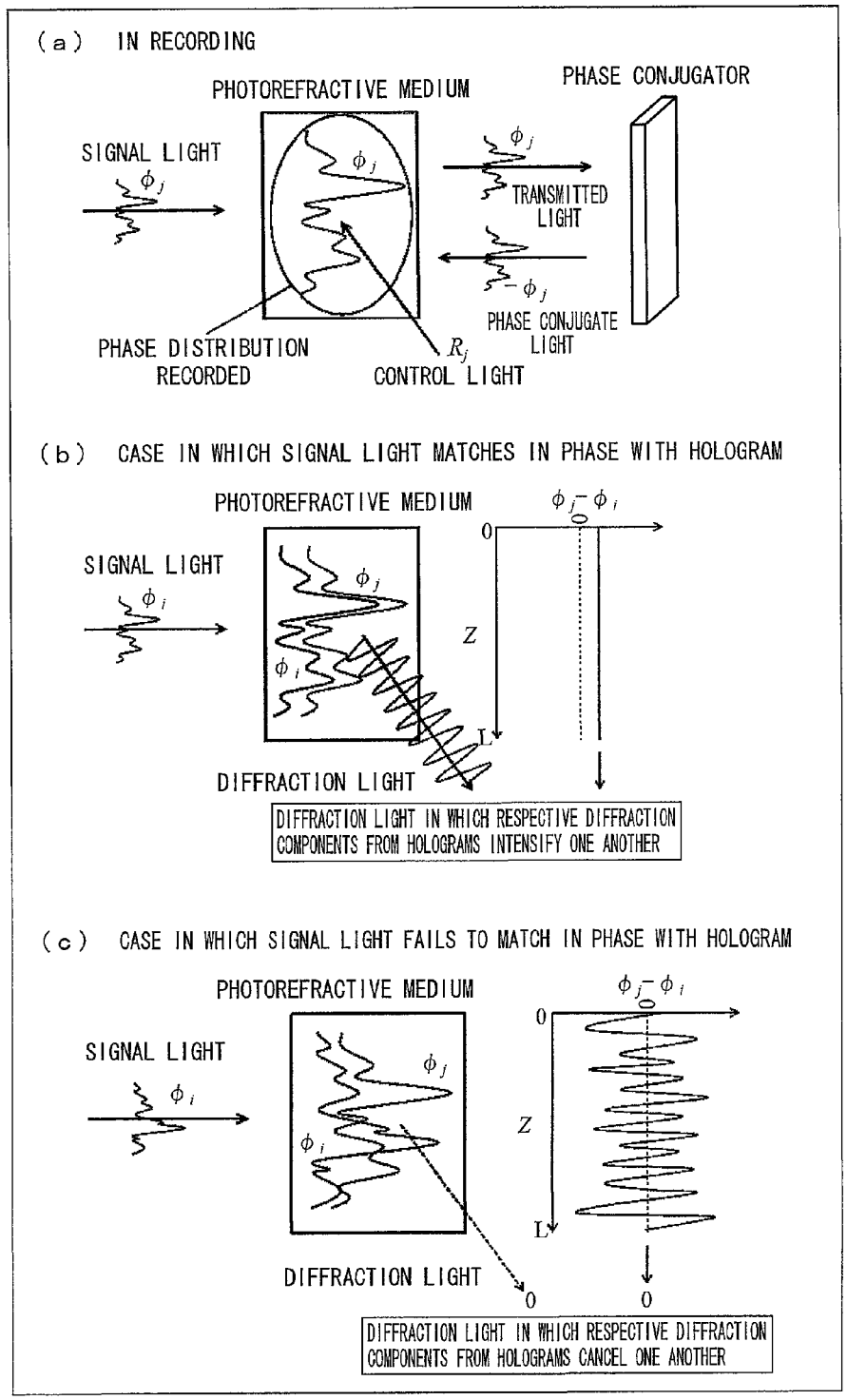
FIG. 2

The optical communication system uses (i) the amplified phase conjugate light 18 as hologram recording light and (ii) another light beam, that is, control light 15 that is incident at different angles in respective spatial modes, to record a dynamic hologram (that is, a hologram that can be rewritten) in the photorefractive medium 13 (see (a) of FIG. 2). For the photorefractive effect, see Yeh, Pochi: *Photorefractive Hisenkei Kougaku* (Introduction to Photorefractive Nonlinear Optics) translated by Tomida, Yasuo and Kitayama, Kenichi, Maruzen. In the present system, the control light 15 is a simple plane wave.

The dynamic hologram to be recorded has an amplitude that is proportional to $$q_j = A_j R_j M \exp(j\phi_j) \quad (3),$$

where $R_j$ is the intensity of the control light 15. A communication fiber in actuality transmits only a weak photoelectric force, which may fail to provide a light intensity sufficient to write a hologram. This problem is solved by an amplification effect by the phase conjugator 17. A communication is blocked for a certain time period when a dynamic hologram is written into the photorefractive medium 13 with use of the guide light 14. Amplifying light for writing a dynamic hologram is effective in reducing such a time period as well. Further, in the case where the photorefractive medium 13 is irradiated, on both its front and back surfaces, with guide light 14 including spatial-mode information, a spatially uniform hologram can be recorded in the medium, which will improve diffraction efficiency.

In the case where dynamic holograms are recorded through a similar operation for the mode numbers j=1, 2, ..., N with use of control light 15 that is incident at different angles, multiplexed dynamic holograms each have an amplitude Q represented by the formula below.

[Math 1]

$$Q = \sum_{j=1}^{N} q_j = \sum_{j=1}^{N} A_j R_j M \exp(j\phi_j) \quad (4)$$

where N is the number of spatial-mode signals to be multiplexed and is equal to the multiplicity of holograms.

Conventional angle multiplexing techniques carry out multiplex recording by, while fixing the angle of object light (that is, information to be recorded), changing the angle of light (control light) for determining which multiplexed hologram is to be reproduced (see *Holographic Memory no System to Zairyou* [System and Material for Holographic Memory], edited by Shimura, Tsutomu, Chapter 2, CMC Publishing Co., Ltd.). Thus, all object light travels in an identical direction during reproduction. In contrast, the present system carries out multiplex recording by, while fixing the incidence angle of light (in the present system, the phase conjugate light 18) for determining which hologram is to be reproduced, changing the angle of light (in the present system, the control light 15) corresponding to conventional object light.

The present invention can use, for example, either of the methods illustrated in FIGS. 12 and 13 as a method for inputting multimode signal light. The method illustrated in FIG. 12 causes signal light beams emitted by respective lasers 1 through 3 to pass through respective CGHs 1 through 3 to provide signal light beams having respective spatial modes different from one another. The CGHs 1 through 3 are computer-generated Fourier holograms for creating different spatial modes. The CGHs include, recorded therein, respective Fourier transform images for different spatial modes. The CGHs 1 through 3 thus create different spatial modes for respective signal light beams, which are superimposed over one another through reflecting/transmitting mirrors 20 and 21 and which then enter a lens L1 at an identical incidence angle. The CGHs 1 through 3 and the lens L1 are adjusted so that the respective optical path lengths from the CGHs to the lens are equal to one another. The following document discloses a method that is similar to the method illustrated in FIG. 12, the disclosed method exciting a single spatial mode: F. Dubois, Ph. Emplit, and O. Hugon, *Selective mode excitation in graded-index multimode fiber by a computer-generated optical mask*, Optics Letters, Vol. 19, No. 7, pp. 433-435 (1994). Although the disclosed method does not involve multiplexing, the document indicates that a particular mode can be excited with use of a multimode fiber.

The method illustrated in FIG. 13 involves three CGHs 1 through 3 arranged next to one another and independent of one another. In actuality, however, the angle difference Θ can be greatly reduced by creating a plurality of hologram regions in a single CGH that are different from one another in diffraction angle. This arrangement can reduce distortion and coupling loss in a spatial mode both caused by oblique incidence on the fiber. The method can further carry out multiplexing two-dimensionally, that is, additionally in a direction perpendicular to the surface of FIG. 13, and can thus handle great multiplicity. The method of FIG. 13 involves a lens L1 including three lenses, the lens L1 having a focal length that needs to be set in accordance with the optical path length. If the above integration of the CGHs allows Θ to be within a paraxial region, the lens L1 can simply be a single lens (this arrangement further eliminates the need for the lens L3 illustrated in FIG. 13). In the example of FIG. 13, assuming (i) the use of an integrated CGH with d=3 mm and (ii) the optical path length f1 of approximately 20 mm between the CGH and the lens L1, multiplexing approximately 5 (length)×5 (width) =25 signals allows θ to be sufficiently small, which makes it possible to produce a simple optical system including a common lens L1.

While conventional art embeds, in object light, information to be recorded, the present system embeds no information in the control light 15, which may be a simple plane wave. The present system intends to form in the photorefractive medium 13 a diffraction grating that causes a signal to travel in a direction which is changed on the basis of spatial phase information included in the signal itself. The present system causes signal light S as multiplexed in spatial modes to enter the dynamic multiplex hologram created as above. The signal light S is represented by Formula (5) below.

[Math 2]

$$S = \sum_{i=1}^{N} A_i(t) \exp(-j\phi_i) \quad (5)$$

Respective signals to be modulated in the spatial modes are each represented by $$A_i(t) \exp(-j\phi_i).$$

With equal mode numbers i=j, the signals each have a spatial phase distribution identical to that of the guide light of Formula (1). Irradiating the dynamic multiplex hologram of Formula (4) with the multiplexed signal light of Formula (5) produces diffraction light O, which is proportional to

[Math 3]

$$O = \int_0^L SQ\,dz = \int_0^L \sum_{i=1}^{N} \sum_{j=1}^{N} A_i(t) A_j R_j M \exp(j\phi_j - j\phi_i)\,dz \quad (6)$$

where L is the thickness of the multiplex hologram, and z is the coordinate along the thickness direction. The diffraction light to be observed corresponds to the sum (integrated value) of components that are each diffracted, in the photorefractive medium 13, at a position along the thickness direction. Since the random-phase plate 12 and the lens 19 cause the amplitude to change slowly, O can be approximated as below.

[Math 4]

$$O \approx \sum_{i=1}^{N} \sum_{j=1}^{N} A_i(t) A_j R_j M \int_0^L \exp(j\phi_j - j\phi_i)\,dz \quad (7)$$

In the case where the thickness L of a hologram is sufficiently large, the integrated value in the above Formula is, due to the phase-matching property in the volume hologram (hereinafter referred to as "volume hologram" since it fails to produce its effect if the thickness is not sufficiently large) illustrated in FIG. 2, an extremely large value if the formula below is satisfied, whereas the diffraction light is weak if it is not satisfied.

$$\phi_i = \phi_j, \text{ that is, } i = j \quad (8)$$

In other words, in the case where signal light entering the photorefractive medium 13 matches in phase with the holograms recorded in the photorefractive medium 13, diffraction light is obtained in which respective diffraction components from the holograms intensify one another (see (b) of FIG. 2). On the other hand, in the case where signal light entering the photorefractive medium 13 fails to match in phase with the holograms recorded in the photorefractive medium 13, diffraction light is obtained in which respective diffraction components from the holograms cancel each other (see (c) of FIG. 2).

Diffraction light 16 actually observed is represented by the formula below.

[Math 5]

$$O \approx \sum_{i=1}^{N} A_i(t) A_i R_i M L \quad (9)$$

The diffraction light thus travels in the direction opposite to the traveling direction of the control light 15 used in recording a dynamic multiplex volume hologram. In the case where control light beams $R_1, R_2, \ldots, R_N$ are, in the hologram writing, light beams having respective angles different from one another, the individual signal components $A_1(t), A_2(t), \ldots, A_N(t)$ are diffracted by the dynamic multiplex volume holograms in the photorefractive medium 13 as diffraction light beams having respective angles different from one another, and can thus be separated into signal components in respective spatial modes before multiplexed spatial-mode signal light is converted into an electric signal.

In other words, the optical communication system of the present invention includes, in a multiplex-hologram recording section (for example, a photorefractive medium), multiplex holograms for signal separation. These multiplex holograms are recorded in the multiplex-hologram recording section by irradiation thereof with (i) guide light, which has a wave front identical to that of signal light, and (ii) control light emitted at different angles for respective spatial modes.

When multiplexed signal light beams in the respective spatial modes have entered the multiplex-hologram recording section, in which the multiplex holograms are recorded as above, the signal light beams in the respective spatial modes are separated in respective directions of the angles of the control light beams emitted to the multiplex-hologram recording section for the recording of the multiplex holograms. The signal separation basically requires no irradiation of control light. However, irradiating the multiplex-hologram recording section with either control light or a combination of control light and phase conjugate light will maintain or improve the signal separation ability.

The description above deals separately with (i) the process of writing a dynamic multiplex volume hologram with use of phase conjugate light and (ii) the subsequent process of separating spatial-mode multiplex signals. The two processes can, however, be simultaneously carried out in actuality. Dynamic holograms may be degraded over time due to the separation of spatial-mode multiplex signals. Thus, the phase conjugator 17 can, for example, in advance record information on the wave fronts of all spatial-mode light so that new dynamic holograms are written or the existing dynamic holograms are rewritten while the separation of spatial-mode multiplex signals is being carried out (that is, while the communication is maintained).

While the description above mentions the photorefractive medium 13 as the multiplex-hologram recording section, the present invention is not limited to such an arrangement. Specifically, in the description above, the photorefractive medium 13 is used to allow hologram rewriting. If no hologram is to be rewritten, the optical communication system can operate even with a normal non-photorefractive hologram medium such as a photo-polymer. However, the majority of mediums other than a photorefractive medium do not allow rewriting of a hologram after its creation. Thus, there is the following drawback: it is impossible to maintain signal separation by rewriting a hologram as with a photorefractive medium in response to, for example, a temporal change and distortion in the mode of transmission through an optical fiber. The use of a photorefractive medium 13 is thus advantageous.

A spatial mode for transmission through a communication fiber may be changed over time. To counter this problem, dynamic holograms in the photorefractive medium can simply be reconstructed at certain time intervals in order to adjust to the spatial mode as changed. Such reconstruction requires a repeat of the respective operations of Formulae (1) through (9). The communication is, however, blocked for a certain time period in the case where a hologram is written on the basis of new spatial-mode information that is not accumulated in the phase conjugator. Amplifying guide light with use of a phase conjugator is effective in reducing such a time period as well (with a higher intensity for recording light, a shorter time period is required for hologram recording).

A phase conjugator with an amplifying function is produced by a technique such as four-wave mixing (see Sakai, Junichi: *Isou Kyouyaku Kougaku* [Phase Conjugate Optics], Asakura Publishing Co., Ltd., Chapter 6). This optical amplification simply needs to invert the phase distribution of spatial-mode light to increase only the light intensity, and does not need to respond at a rate equal to the modulation rate of a signal traveling through a fiber. The phase conjugator can thus advantageously be produced easily by an existing technique.

The phase conjugator 17 of the present invention, which markedly contributes to improvement in performance of the optical communication system, is not an essential constituent. The phase conjugator is first effective, in the case where the medium is not a photorefractive medium but a normal hologram medium, in (i) reducing the time period necessary for hologram writing and (ii) improving the quality of a hologram to be written, which in turn improves the optical signal separation performance. Further, in the case where the medium is a photorefractive medium, the conjugator is also effective in, other than the above points, preventing a created multiplex hologram from being degraded by irradiation thereof with an optical signal.

As described above, the optical communication system of the present invention has the following features:

A) The present technique achieves an all-optical separation of a plurality of spatial modes to transmit independent signals in the respective spatial modes through an optical fiber. The present technique is not limited in number of spatial modes for the separation, and thus contributes to a dramatic increase of channel capacity.

B) The present technique is effective in separating optical signals, while they remain as optical signals, in not only a polarized-wave mode but also any spatial mode for transmission through an optical waveguide. The present technique is highly superior in speed and accuracy to a system that separates multiplexed signals after a photoelectric conversion.

C) The present technique can use a conventional multimode fiber as an optical transmission line. A multimode fiber is cheaper than a single-mode fiber, which is used in many of the existing optical communication systems, and can be easily connected to another. The optical transmission line is, however, not limited to a multimode fiber as long as it is a waveguide that transmits light in a plurality of spatial modes. The optical transmission line can be any of various optical waveguides including the latest photonic crystal waveguide.

D) The present technique uses a photorefractive medium as a dynamic multiplex volume hologram recording section, and thus, even if a mode for transmission through a fiber has been changed over time, allows a hologram to be rewritten in correspondence with such a mode change (dynamic reconstruction function). The hologram recording medium may be a normal sensitive material, in which case a hologram created is static (fixed) and thus cannot be rewritten in correspondence with a change in a spatial mode of the optical fiber.

E) Dynamic holograms may be degraded over time due to the separation of spatial-mode multiplex signals. Thus, the phase conjugator can, for example, in advance record information on the wave fronts of all spatial-mode light so that new dynamic holograms are written or the existing dynamic holograms are rewritten while the separation of spatial-mode multiplex signals is being carried out (that is, while the communication is maintained).

F) The present technique can additionally include a router function that changes a combination of a particular spatial mode and the incidence angle of control light for recording and rewriting of a dynamic hologram in order to, as necessary, switch spatial modes of an optical signal to set which spatial mode is assigned to which output port.

G) The present technique, which uses a phase conjugator with an amplification function, can create a dynamic multiplex volume hologram that is spatially uniform and that is large in hologram amplitude. The present technique can thus (i) increase the speed of writing a hologram for an accurate mode separation and (ii) increase the intensity of diffracted signal light beams as separated. Further, the present technique, as a result of the increase (see D) above) in the speed of rewriting a hologram, can reduce the time period during which an optical signal is blocked due to rewriting of a hologram in correspondence with a mode change.

Example 1

(1) Numerical Simulation

The present simulation was conducted by an analysis method of fast Fourier transform beam propagation method (FFT-BPM) (see L. Thylen, Opt. Quant. Elect. 15, pp. 433-439 [1990]).

The present simulation used the system illustrated in FIG. 3. The present simulation assumed spatial modes A, B, and C that spatially coincided with one another as illustrated in (a) of FIG. 4, and separated triply multiplexed light. The present simulation recorded, in a multiplex manner, holograms with use of control light having angles θ of 6°, 8°, and 10° of incidence on a recording medium with respect to the respective spatial modes A, B, and C. The present simulation expressed, in terms of complex amplitude of a Gauss beam, the respective differences (that is, $8.7 \times 10^{-5}$, $8.6 \times 10^{-5}$, and $8.5 \times 10^{-5}$ (m), respectively) in the radius of curvature occurring due to the difference between the exit angles of light in the respective spatial modes at the exit end of the fiber. Specifically, the present simulation used the phase below for each spatial mode.

$$\exp\left[-jkz - jk\frac{\rho^2}{2R(z)} + j\zeta(z)\right] \qquad \text{[Math 6]}$$

Further, with λ being a wavelength and z being a propagation coordinate, $$k = \frac{\lambda}{2\pi},\ R(z) = z\left[1 + \left(\frac{z_0}{z}\right)^2\right]^{\frac{1}{2}},\ \zeta(z) = \tan^{-1}\frac{z}{z_0} \qquad \text{[Math 7]}$$

for which the beam divergence angle $\theta_0$ is determined as below.

$$\theta_0 = \sqrt{\frac{\lambda}{\pi z_0}} \qquad \text{[Math 8]}$$

Figure 4:
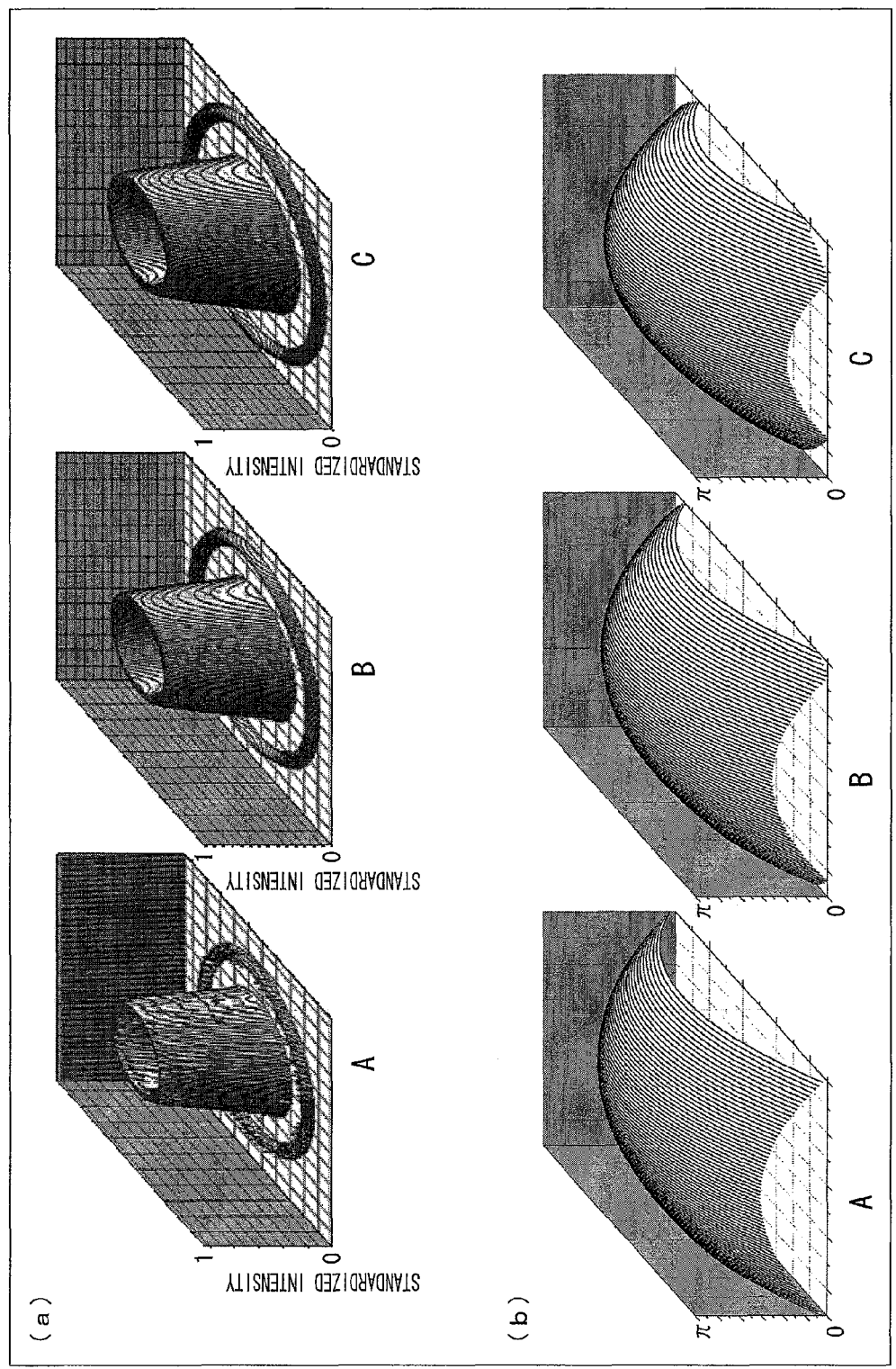

Assuming a multimode fiber with a diameter of 50 μm and NA of 0.22, the fiber has a propagation permissible angle θ of $3.9° \leq \theta \leq 8.7°$. In view of this, the present simulation assumed exits of light from the fiber at the angles of 3.900° for the mode A and 3.903° and 3.906° for the respective modes B and C. (b) of FIG. 4 illustrates respective phase distributions derived from the above for the individual spatial modes. Table 1 shows other parameters used in the analysis. Table 2 shows physical parameters. (a) and (b) of FIG. 5 each illustrate an analysis model. (a) of FIG. 5 illustrates an analysis model for a hologram recording process, whereas (b) of FIG. 5 illustrates an analysis model for a spatial-mode separation process.

TABLE 1

Parameters used in analysis

| | |
|---|---|
| Maximum refractive index modulation amount $n_{max}$ | $1.0 \times 10^{-3}$ |
| Sample numbers $N_x \times N_y \times N_z$ in (x, y, z) directions | $1024 \times 1024 \times 150$ |
| Step size $\Delta_x \times \Delta_y \times \Delta_z$ in (x, y, z) directions | $0.6 \times 0.6 \times 6.6$ |
| Sampling rate $N_1$ | 4 |
| Zero padding $N_2$ | 4 |
| Pixel number $N_{px} \times N_{py}$ | $64 \times 64$ |
| Pixel size $l_{px} \times l_{py}$ (µm²) | $5 \times 5$ |

TABLE 2

Physical parameters

| | |
|---|---|
| Wavelength λ (nm) | 514.5 |
| Refractive index $n_0$ | 1.5 |
| Size $W_x \times W_y \times L$ (µm) of recording medium | $617 \times 617 \times 1000$ |
| Focal length f (m) | $6.0 \times 10^{-3}$ |
| Exposure time t (ms) | 0.1 |

FIG. 6 shows the results of a simulation involving no random-phase plate and no lens in the system illustrated in FIG. 3. FIG. 7 shows the results of a simulation involving a random-phase plate and a lens in the system illustrated in FIG. 3. A hologram to be recorded first passes through the random-phase plate and then passes through the lens to be recorded on the medium on a Fourier plane. This fixes the intensity plane of a spatial mode, and thus increases the control rate for a phase plane. The random-phase plate used in the simulation had a size of 128×128 pixels, and the pixel size was 40×40 (µm), and had a [0π] phase.

The simulation recorded each spatial-mode information item onto a hologram recording medium, and irradiated the medium with signal light in all spatial modes. FIGS. 6 and 7 each show, as the results of the simulation, the intensities of diffraction light for respective components with respect to different angles. Comparison between FIGS. 6 and 7 shows that (i) the system including no random-phase plate and no lens clearly failed to separate light into the individual spatial modes, and that (ii) the system including a random-phase plate and a lens, in contrast, allowed diffraction light for a necessary spatial mode to be sufficiently emitted as compared to unnecessary mode information (cross talk) (this system secured a selectivity of approximately 90%). Although the latter system showed a diffraction efficiency of approximately 0.048%, the diffraction efficiency is improved by, in the system illustrated in FIG. 3, increasing (i) the thickness of the medium or (ii) the intensity of phase conjugate light for hologram writing. This approach to the above system on the basis of a numerical simulation shows that the system provides a technique that is highly effective in separating different spatial modes that coincide with one another.

(2) Operation Experiment

The following describes (i) an experiment system used in an experiment in confirming the operation of the present technique and (ii) the results of the experiment.

FIG. 8 illustrates the experiment system used in the present operation experiment. This system (i) did not include a phase conjugator that would be included in an actual system, and (ii) recorded a dynamic multiplex volume hologram with use of guide light and control light. Multiplex holograms created in photorefractive crystal caused signal light including light in spatial modes to be emitted as diffraction light from an end surface of the recording medium which end surface was opposite to the end surface onto which the control light was incident. The experiment observed respective diffraction light components for different angles to confirm separation into the individual spatial modes. The experiment (i) recorded the spatial modes of FIG. 4 with use of a spatial light modulator (SLM), (ii) adjusted the polarizer and analyzer to create different spatial modes for respective radii of curvature, and consequently (iii) imparted, as three spatial modes A, B, and C, the phase distributions of FIG. 9 to signal light. The experiment used a random-phase plate with 128×128 pixels and [0, π]. The experiment changed angles of the control light by means of rotation of a mirror during the recording to record, in a triple multiplex manner, the spatial modes A, B, and C at the respective angles of the control light of $\theta_1$, $\theta_2$, and $\theta_3$. FIG. 10 plots the respective intensities of diffraction light against the individual components for the angles. FIG. 10 clearly shows strong emission of a diffraction light component necessary as a result of spatial-mode separation (the experiment achieved a selectivity of approximately 70%). The results of the experiment showed a diffraction efficiency of 3.67%. The present operation experiment, which used a photoinduced refractive index medium of $LiNbO_3$ (Fe-doped, with a thickness of L=5 mm) as a recording medium, had a large increase in diffraction efficiency as compared to the results (0.048%) of the above simulation, in which the thickness L=1 mm. However, due to such factors as the absence of a phase conjugator, the present operation experiment produced results that were poorer than those of the numerical simulation (see FIG. 7) in terms of the ability of spatial-mode separation.

Example 2

While a spatial mode of light propagating through an actual fiber depends on the kind and shape of the fiber to be used, it is an LP mode that is a spatial mode of light propagating through the most standard multimode fiber. For details of the LP mode, see Bahaa E. A. Saleh, Malvin Carl Teich, *Fundamentals of Photonics*, Chapter 8 (Fiber Optics), John Wiley 85 Sons, Inc. (1991).

The present experiment carried out a spatial-mode separation with use of an experiment system identical to that of FIG. 8 to use SLM as a more practical spatial mode for creation of an LP mode.

The present experiment used, for recording, spatial-mode light in the modes $LP_{01}$, $LP_{11}$, $LP_{21}$, $LP_{52}$, and $LP_{93}$ shown in FIG. 14. The present experiment imparted, to signal light, the respective distributions for the individual spatial modes with an accuracy of 100 (lengthwise)×130 (widthwise) pixels in SLM. The experiment first measured a signal selectivity by recording, in a multiplex manner, three spatial modes of $LP_{01}$, $LP_{11}$, and $LP_{21}$, which are a combination of spatial modes with a relatively high similarity. The experiment then measured a signal selectivity by recording, in a multiplex manner, three spatial modes of $LP_{01}$, $LP_{52}$, and $LP_{93}$, which are a combination of spatial modes with a relatively low similarity. The three spatial modes were recorded with reference light angles $\theta_1$, $\theta_2$, and $\theta_3$ of 15°, 20°, and 25°, respectively. FIG. 15 illustrates the relation between (i) diffraction light for signal components obtained by mode separation and (ii) cross talk. FIG. 15 shows a higher separation ratio for multiplexing of LP modes with a lower similarity. The present experiment produced a diffraction efficiency of approximately 1.8%. The present experiment, which involved no random-phase plate, may produce an improved separation ratio with use of a random-phase plate.

As described above, an optical communication system of the present invention is an optical communication system for carrying out a communication, the optical communication system including: an optical fiber for transmitting signal light having a plurality of spatial modes; a multiplex-hologram recording section including holograms recorded therein in a multiplex manner in correspondence with the respective spatial modes of the signal light; a lens for condensing the signal light emitted from an end of the optical fiber and causing the condensed signal light to enter the multiplex-hologram recording section; and a control-light emitting section for emitting control light to the multiplex-hologram recording section at angles different from one another in correspondence with the respective spatial modes, the multiplex-hologram recording section including multiplex holograms recorded therein by irradiation of the multiplex-hologram recording section with (i) guide light which has a wave front identical to a wave front of the signal light and (ii) the control light, the signal light having the spatial modes, the signal light having been multiplexed and inputted to the multiplex-hologram recording section when the multiplex-hologram recording section separates the signal light, being separated along paths of the control-light emitting section in respective directions of emission of the control light.

Further, an optical communication system of the present invention is an optical communication system for carrying out a communication, the optical communication system including: an optical fiber for transmitting signal light having a plurality of spatial modes; a multiplex-hologram recording section including holograms recorded therein in a multiplex manner in correspondence with the respective spatial modes of the signal light; a lens for condensing the signal light emitted from an end of the optical fiber and causing the condensed signal light to enter the multiplex-hologram recording section; and a control-light emitting section for emitting control light to the multiplex-hologram recording section at angles different from one another in correspondence with the respective spatial modes, with use of the multiplex-hologram recording section, which includes holograms written therein by irradiation of the multiplex-hologram recording section with (i) guide light which has a wave front identical to a wave front of a signal light beam having a particular spatial mode and (ii) the control light, the optical communication system causing holograms to be recorded in a multiplex manner by the control-light emitting section for emitting the control light to the multiplex-hologram recording section at the angles different from one another in correspondence with the respective spatial modes, after the recording, the optical communication system, when the multiplex-hologram recording section separates the signal light for a signal communication, emitting (i) the guide light which has the wave front identical to the wave front of the signal light beam having the particular spatial mode and (ii) the control light to the multiplex-hologram recording section so that the signal light having the spatial modes, the signal light having been multiplexed and inputted to the multiplex hologram recording section, is separated along paths of the control-light emitting section in respective directions of emission of the control light.

Further, an optical communication system of the present invention is an optical communication system for carrying out a communication, the optical communication system including: an optical fiber for transmitting signal light having a plurality of spatial modes; a multiplex-hologram recording section including holograms recorded therein in a multiplex manner in correspondence with the respective spatial modes of the signal light; a lens for condensing the signal light emitted from an end of the optical fiber and causing the condensed signal light to enter the multiplex-hologram recording section; a control-light emitting section for emitting control light to the multiplex-hologram recording section at angles different from one another in correspondence with the respective spatial modes; and a phase conjugator for (i) amplifying light having passed through the multiplex-hologram recording section and (ii) returning the amplified light to the multiplex-hologram recording section, with use of the multiplex-hologram recording section, which includes holograms written therein by irradiation of the multiplex-hologram recording section with (i) light from the phase conjugator which light has a wave front identical to a wave front of a signal light beam having a particular spatial mode and (ii) the control light, the optical communication system causing holograms to be recorded in a multiplex manner by the control-light emitting section for emitting the control light to the multiplex-hologram recording section at the angles different from one another in correspondence with the respective spatial modes, after the recording, the optical communication system, when the multiplex-hologram recording section separates the signal light for a signal communication, emitting (i) the light from the phase conjugator which light has the wave front identical to the wave front of the signal light beam having the particular spatial mode and (ii) the control light to the multiplex-hologram recording section so that the signal light having the spatial modes, the signal light having been multiplexed and inputted to the multiplex hologram recording section, is separated along paths of the control-light emitting section in respective directions opposite to directions of emission of the control light.

With the above arrangement, the multiplex-hologram recording section includes multiplex holograms recorded therein by irradiation of the multiplex-hologram recording section with (i) guide light which has a wave front identical to a wave front of the signal light and (ii) control light emitted at angles different from one another in correspondence with the respective spatial modes. Further, the signal light having the spatial modes, the signal light having been multiplexed and inputted to the multiplex-hologram recording section, is separated in respective directions of the angles of the control light emitted in the multiplex-hologram recording. In other words, the above arrangement makes it possible to cause optical signals, which include a mix of optical signals in a plurality of spatial modes when emitted from the optical fiber, to be separated into light in different modes while remaining as light.

The optical communication system may preferably further include: a random-phase plate disposed on a side of the multiplex-hologram recording section from which side the signal light enters the multiplex-hologram recording section.

According to the above arrangement, in the case where signal light before entering the random-phase plate merely exhibits a spatially gentle phase change with respect to a difference in spatial mode, causing the signal light to pass through the random-phase plate allows the guide light to have a phase distribution that varies in a spatially very fine manner. The above arrangement, even with only a slight difference in spatial mode, generates signal light having a greatly different phase distribution, and thus makes it possible to significantly increase accuracy in signal separation.

The optical communication system may preferably further include: a phase conjugator for (i) amplifying light having passed through the multiplex-hologram recording section and (ii) returning the amplified light to the multiplex-hologram recording section.

The above arrangement can increase the speed of hologram writing and improve quality, and allows holograms to be written to the multiplex-hologram recording section with use of only a weak photoelectric force transmitted through a fiber for communication. Specifically, the hologram medium for use as the multiplex-hologram recording section of the present invention is first irradiated with (i) guide light having a wave front identical to the wave front of signal light having a particular spatial mode and (ii) the control light so that holograms for signal separation are written. The use of a phase conjugator makes it possible to (i) reduce the time period necessary for hologram writing and (ii) improve the quality of a hologram to be written, which in turn improves the optical signal separation performance. Further, even in the case where (i) the guide light has only a weak photoelectric force and (ii) it is thus impossible to achieve a light intensity sufficient for hologram writing, the amplification effect by the phase conjugator allows multiplex holograms to be written on the hologram medium. In addition, in the case where the hologram medium is a photorefractive medium, the phase conjugator is also effective in, other than the above points, preventing a created multiplex hologram from being degraded by irradiation thereof with an optical signal.

The optical communication system may preferably be arranged such that the multiplex-hologram recording section is a photorefractive medium.

The above arrangement, which uses a photorefractive medium as the multiplex-hologram recording section, facilitates creating a dynamic hologram (rewritable hologram) in the multiplex-hologram recording section. Thus, even in the case where spatial-mode light transmitted through an optical fiber has been changed over time or distorted by an external environment (for example, a bend of the fiber and/or a temperature change), the above arrangement, which dynamically rewrites a hologram, makes it possible to maintain communication.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

REFERENCE SIGNS LIST 11 optical fiber
12 random-phase plate
13 photorefractive medium
14 guide light
15 control light
16 diffraction light
17 phase conjugator
18 phase conjugate wave
19 lens

The invention claimed is:
1. An optical communication system for carrying out a communication,
the optical communication system comprising:
an optical fiber for transmitting signal light having a plurality of spatial modes;
a multiplex-hologram recording section including holograms recorded therein in a multiplex manner in correspondence with the respective spatial modes of the signal light;
a lens for condensing the signal light emitted from an end of the optical fiber and causing the condensed signal light to enter the multiplex-hologram recording section; and
a control-light emitting section for emitting control light to the multiplex-hologram recording section at angles different from one another in correspondence with the respective spatial modes,
the multiplex-hologram recording section including multiplex holograms recorded therein by irradiation of the multiplex-hologram recording section with (i) guide light which has a wave front identical to a wave front of the signal light and (ii) the control light,
the signal light having the spatial modes, the signal light having been multiplexed and inputted to the multiplex-hologram recording section when the multiplex-hologram recording section separates the signal light, being separated along paths of the control-light emitting section in respective directions of emission of the control light.

2. The optical communication system according to claim 1, further comprising:
a random-phase plate disposed on a side of the multiplex-hologram recording section from which side the signal light enters the multiplex-hologram recording section.

3. The optical communication system according to claim 1, further comprising:
a phase conjugator for (i) amplifying light having passed through the multiplex-hologram recording section and (ii) returning the amplified light to the multiplex-hologram recording section.

4. The optical communication system according to claim 1, wherein:
the multiplex-hologram recording section is a photorefractive medium.

5. An optical communication system for carrying out a communication,
the optical communication system comprising:
an optical fiber for transmitting signal light having a plurality of spatial modes;
a multiplex-hologram recording section including holograms recorded therein in a multiplex manner in correspondence with the respective spatial modes of the signal light;
a lens for condensing the signal light emitted from an end of the optical fiber and causing the condensed signal light to enter the multiplex-hologram recording section; and
a control-light emitting section for emitting control light to the multiplex-hologram recording section at angles different from one another in correspondence with the respective spatial modes,
with use of the multiplex-hologram recording section, which includes holograms written therein by irradiation of the multiplex-hologram recording section with (i) guide light which has a wave front identical to a wave front of a signal light beam having a particular spatial mode and (ii) the control light, the optical communication system causing holograms to be recorded in a multiplex manner by the control-light emitting section for emitting the control light to the multiplex-hologram recording section at the angles different from one another in correspondence with the respective spatial modes,
after the recording, the optical communication system, when the multiplex-hologram recording section separates the signal light for a signal communication, emitting (i) the guide light which has the wave front identical to the wave front of the signal light beam having the particular spatial mode and (ii) the control light to the multiplex-hologram recording section so that the signal light having the spatial modes, the signal light having been multiplexed and inputted to the multiplex hologram recording section, is separated along paths of the control-light emitting section in respective directions of emission of the control light.

6. An optical communication system for carrying out a communication, the optical communication system comprising:

an optical fiber for transmitting signal light having a plurality of spatial modes;

a multiplex-hologram recording section including holograms recorded therein in a multiplex manner in correspondence with the respective spatial modes of the signal light;

a lens for condensing the signal light emitted from an end of the optical fiber and causing the condensed signal light to enter the multiplex-hologram recording section;

a control-light emitting section for emitting control light to the multiplex-hologram recording section at angles different from one another in correspondence with the respective spatial modes; and a phase conjugator for (i) amplifying light having passed through the multiplex-hologram recording section and (ii) returning the amplified light to the multiplex-hologram recording section, with use of the multiplex-hologram recording section, which includes holograms written therein by irradiation of the multiplex-hologram recording section with (i) light from the phase conjugator which light has a wave front identical to a wave front of a signal light beam having a particular spatial mode and (ii) the control light, the optical communication system causing holograms to be recorded in a multiplex manner by the control-light emitting section for emitting the control light to the multiplex-hologram recording section at the angles different from one another in correspondence with the respective spatial modes, after the recording, the optical communication system, when the multiplex-hologram recording section separates the signal light for a signal communication, emitting (i) the light from the phase conjugator which light has the wave front identical to the wave front of the signal light beam having the particular spatial mode and (ii) the control light to the multiplex-hologram recording section so that the signal light having the spatial modes, the signal light having been multiplexed and inputted to the multiplex hologram recording section, is separated along paths of the control-light emitting section in respective directions opposite to directions of emission of the control light.

7. The optical communication system according to claim 5, wherein:

the optical communication system, when the multiplex-hologram recording section separates the signal light for a signal communication, first emits (i) the guide light which has the wave front identical to the wave front of the signal light beam having the particular spatial mode and (ii) the control light to the multiplex-hologram recording section so that the signal light having the spatial modes, the signal light having been multiplexed and inputted to the multiplex hologram recording section, is separated along the paths of the control-light emitting section in the respective directions of emission of the control light, and then emits (i) the guide light which has a wave front identical to a wave front of a signal light beam having a spatial mode different from the particular spatial mode and (ii) the control light to the multiplex-hologram recording section so that the signal light having the spatial modes, the signal light having been multiplexed and inputted to the multiplex hologram recording section, is separated along the paths of the control-light emitting section in the respective directions of emission of the control light.

8. The optical communication system according to claim 6, wherein:

the optical communication system records, in the phase conjugator, a wave front of guide light which wave front is identical to a wave front of a signal light beam having a particular spatial mode;

with use of the multiplex-hologram recording section, which includes holograms written therein by irradiation of the multiplex-hologram recording section with (i) the control light and (ii) the wave front recorded in the phase conjugator, the optical communication system, after the recording, causes holograms to be recorded in a multiplex manner by the control-light emitting section for emitting the control light to the multiplex-hologram recording section at the angles different from one another in correspondence with the respective spatial modes; and the optical communication system, when the multiplex-hologram recording section separates the signal light for a signal communication, separates the signal light having the spatial modes, the signal light having been multiplexed and inputted to the multiplex hologram recording section, along the paths of the control-light emitting section in the respective directions opposite to the directions of emission of the control light.

9. The optical communication system according to claim 2, further comprising:

a phase conjugator for (i) amplifying light having passed through the multiplex-hologram recording section and (ii) returning the amplified light to the multiplex-hologram recording section.

10. The optical communication system according to claim 2, wherein:

the multiplex-hologram recording section is a photorefractive medium.

11. The optical communication system according to claim 3, wherein:

the multiplex-hologram recording section is a photorefractive medium.

12. The optical communication system according to claim 4, wherein:

the multiplex-hologram recording section is a photorefractive medium.

13. The optical communication system according to claim 6, wherein:

the optical communication system, when the multiplex-hologram recording section separates the signal light for a signal communication, first emits (i) the guide light which has the wave front identical to the wave front of the signal light beam having the particular spatial mode and (ii) the control light to the multiplex-hologram recording section so that the signal light having the spatial modes, the signal light having been multiplexed and inputted to the multiplex hologram recording section, is separated along the paths of the control-light emitting section in the respective directions of emission of the control light, and then emits (i) the guide light which has a wave front identical to a wave front of a signal light beam having a spatial mode different from the particular spatial mode and (ii) the control light to the multiplex-hologram recording section so that the signal light having the spatial modes, the signal light having been multiplexed and inputted to the multiplex hologram recording section, is separated along the paths of the control-light emitting section in the respective directions of emission of the control light.

* * * * *